(12) United States Patent
Kuwabara

(10) Patent No.: US 6,566,676 B1
(45) Date of Patent: May 20, 2003

(54) IMAGE DETECTOR

(75) Inventor: Takao Kuwabara, Kaisei-machi (JP)

(73) Assignee: Fuji Photo Film Co., Ltd., Kanagawa (JP)

( * ) Notice: Subject to any disclaimer, the term of this patent is extended or adjusted under 35 U.S.C. 154(b) by 0 days.

(21) Appl. No.: 09/666,831

(22) Filed: Sep. 21, 2000

(30) Foreign Application Priority Data

Sep. 21, 1999 (JP) .......................................... 11-266997

(51) Int. Cl.⁷ ................................................. G01T 1/24
(52) U.S. Cl. ....................................................... 250/591
(58) Field of Search ................................. 250/590, 591

(56) References Cited

U.S. PATENT DOCUMENTS

| | | | | |
|---|---|---|---|---|
| 4,085,327 A | * | 4/1978 | Swank et al. | 250/591 |
| 4,535,468 A | * | 8/1985 | Kempter | 250/591 |

FOREIGN PATENT DOCUMENTS

| | | |
|---|---|---|
| EP | 0 989 730 A2 | 3/2000 |
| JP | 10-271374 | 10/1998 |
| JP | 11-87922 | 3/1999 |
| JP | 11-89553 | 4/1999 |
| JP | 11-207283 | 8/1999 |

* cited by examiner

*Primary Examiner*—Constantine Hannaher
*Assistant Examiner*—Shun Lee
(74) *Attorney, Agent, or Firm*—Sughrue Mion, PLLC

(57) ABSTRACT

In an image detector having alternately-aligned linear electrodes for a stripe electrode and linear sub-electrodes for a sub-electrode, short circuiting between the stripe electrode and the sub-electrode is prevented. An insulator layer having transparency to reading light is used outside a second electrode layer in which elements of the stripe electrode are aligned. Elements of the sub-electrode are placed alternately with the elements of the stripe electrode, outside the insulator layer. Thickness of the insulator layer is set as thin as possible to a degree not to cause short circuit between the elements of the two electrodes.

8 Claims, 2 Drawing Sheets

IMAGE DETECTOR

BACKGROUND OF THE INVENTION

1. Field of the Invention

The present invention relates to an optical-reading type image detector comprising a plurality of linear electrodes laid out in a stripe like-shape for obtaining an electric signal in accordance with the amount of latent image charge.

2. Description of the Related Art

Apparatus using image detectors, such as fax machines, copiers, and radiation image recording apparatus have been known.

In radiography for medical diagnoses for example, various kinds of methods and apparatuses using solid-state radiation detectors (electrostatic recording material) as image detectors have been proposed and put into practice. In a solid-state radiation detector, an electric charge obtained by detecting radiation is stored in a capacitor as a latent image charge and the latent image charge having been stored is output after being converted into an electric signal representing radiation image information. As a solid-state radiation detector used in such a method and apparatus, various kinds have been proposed. In terms of an electric-charge reading process for detecting a signal having a magnitude corresponding to the amount of the latent image charge having been stored, optical-reading type detectors on which reading light (an electromagnetic wave for reading) is irradiated are known.

There have been proposed optical-reading type solid-state radiation detectors enabling both fast response upon reading and efficient output of signal electric charge in Japanese Patent Application Nos. 10(1998)-271374, 11(1999)-87922, 11(1999)-89553, and 11(1999)-207283, for example. A detector described therein comprises a first electrode layer (conductive layer) having transparency to recording radiation representing image information or to light emitted by excitation using the radiation (hereinafter called recording light), a recording photoconductive layer exhibiting conductivity by being exposed to the recording light, a charge transport layer acting approximately as an insulator to an electric charge having the same polarity as an electric charge generated in the first electrode layer and acting approximately as a conductor to an electric charge having reverse polarity, a reading photoconductive layer exhibiting conductivity by being exposed to reading light (an electromagnetic wave for reading), and a second electrode layer (conductive layer) having transparency to the reading light, with these layers being disposed in this order. In the detector, a signal electric charge (latent image charge) representing image information is stored in a capacitor formed at an interface between the recording photoconductive layer and the charge transport layer.

In Japanese Patent Application Nos. 11(1999)-87922, 11(1999)-89553, and 11(1999)-207283, the applicant has proposed detectors each having a striped electrode in which a plurality of linear electrodes are laid out in a stripe-like shape as an electrode in the second electrode layer (electrode for light irradiation) having transparency to the reading light, and a plurality of linear sub-electrodes laid out in parallel to and in alternation with the linear electrodes comprising the stripe electrode in the second electrode layer in order to output an electric signal in accordance with the amount of the latent image charge stored in the capacitor.

By using a sub-electrode (electrode for outputting an electric charge) comprising the linear sub-electrodes in the second electrode layer, new capacitors are formed between the capacitor and each of the linear sub-electrodes. Therefore, it becomes possible to electrify the linear sub-electrodes with a transport electric charge having the reverse polarity of the latent image charge stored in the capacitor by recording, due to electric charge redistribution upon reading. In this manner, the amount of the transport electric charge to be distributed to each of the capacitors formed between the capacitor and the linear electrodes comprising the stripe electrode via the reading photoconductive layer can be reduced compared to the case of not using the linear sub-electrodes. As a result, the amount of the signal electric charge output from the detector to the exterior can be increased to improve reading efficiency. At the same time, fast reading response and efficient signal output can be realized.

However, if the linear electrodes comprising the stripe electrode and the linear sub-electrodes comprising the sub-electrode are laid out alternately in the second electrode layer, spacing between each of the linear electrodes and each of the linear sub-electrodes is substantially reduced, which may lead to short circuits between the stripe electrode and the sub-electrode due to a manufacturing defects or the like. If a short circuit occurs, the linear sub-electrodes do not serve as electrodes for improving reading efficiency. If one portion of the both electrodes becomes short-circuited, streaky noise appears in an image in the portion due to reduced reading efficiency caused by the short-circuit, although the reading efficiency itself improves due to the existence of the linear sub-electrodes.

The present invention has been conceived based on consideration of the above problems. An object of the present invention is therefore to provide an image detector not causing the short circuit between the linear electrodes and the linear sub-electrodes.

SUMMARY OF THE INVENTION

An image detector of the present invention has an insulator layer outside a second electrode layer so that an electrode layer for light irradiation (within the second electrode layer) and a charge output electrode face each other via the insulator layer.

In other words, the image detector of the present invention is an optical-reading type image detector and comprises a first electrode layer having transparency to recording light representing image information, a recording photoconductive layer exhibiting conductivity by being exposed to the recording light, a reading photoconductive layer exhibiting conductivity by being exposed to reading light, and a second electrode layer comprising a plurality of linear electrodes having transparency to the reading light and laid out in a stripe-like shape, with these layers being disposed in this order. A capacitor is formed between the recording photoconductive layer and the reading photoconductive layer. In this image detector, an insulator layer having transparency to the reading light is disposed outside the second electrode layer, and a plurality of linear sub-electrodes for outputting an electric signal in accordance with the amount of a latent image charge stored in the capacitor are laid out in a stripe-like shape outside the insulator layer, each of the linear sub-electrodes being laid out alternately with the linear electrodes in the second electrode layer. An electrode comprising the linear sub-electrodes is a sub-electrode (charge output electrode).

"Outside the second electrode layer" refers to a side of the second electrode layer opposite to the reading photoconductive layer, and "outside the insulator layer" refers to a side of the insulator layer opposite to the second electrode layer.

"Being laid out alternately" refers to the case where the linear electrodes in the second electrode layer and the linear sub-electrodes are placed alternately via the insulator layer. A portion of the electrodes may overlap in a direction of electrode disposition.

The "insulator layer having transparency to the reading light" refers to the fact that the insulator layer has transparency to the reading light at least in a portion corresponding to the linear electrodes in the second electrode layer, in the direction of the linear electrode alignment. Therefore, an entire area of the insulator layer does not necessarily have transparency.

In order to cause the insulator layer to have transparency to the reading light, $SiO_2$, SiC, and SiN are preferably used, for example.

According to the image detector of the present invention, the insulator layer having transparency to the reading light is disposed outside the second electrode layer, and the linear electrodes for light irradiation and the linear sub-electrodes for charge output face each other via the insulator layer. Therefore, thickness of the insulator layer can be set freely to some degree so that the electrode for light irradiation and the charge output electrode are not short-circuited. In this manner, short circuiting of the two electrodes can be prevented with certainty.

Furthermore, since the thickness of the insulator layer can be set to a thickness which does not cause the two electrodes to short-circuit, a distance between the two electrodes can be made smaller to some degree, and reading efficiency the same as in the case of the two electrodes being laid out alternately within the second electrode layer can be maintained.

Moreover, since the linear sub-electrodes are located outside the insulator layer, an electrostatic latent image is not erased due to an electric charge poured from the linear sub-electrodes.

DESCRIPTION OF THE PREFERRED EMBODIMENT

Hereinafter, an embodiment of the present invention will be explained with reference to the accompanying drawings.

Figure 1A:
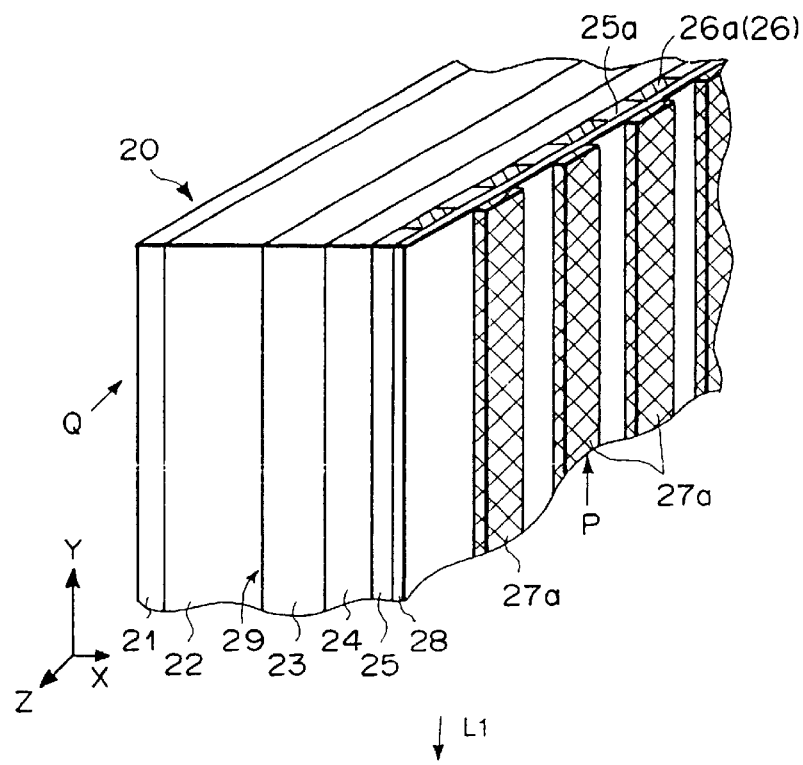
FIG. 1A is an oblique view of a solid-state radiation detector according to an embodiment of the present invention.
Figure 1B:
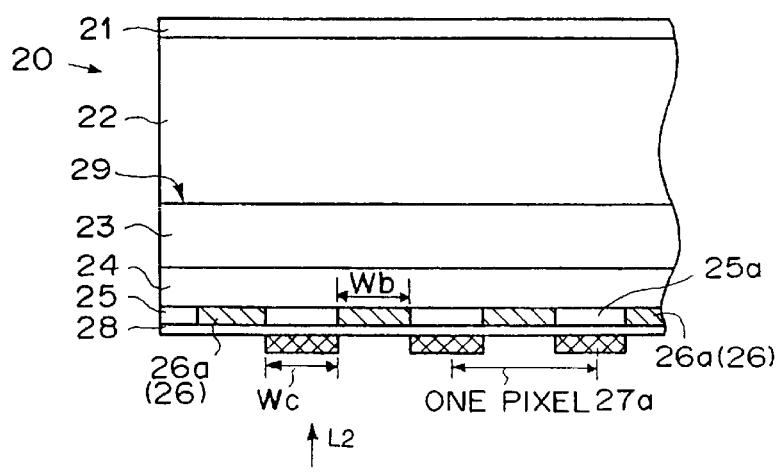
FIG. 1B is an X-Z cross section of a portion shown by an arrow Q.
Figure 1C:
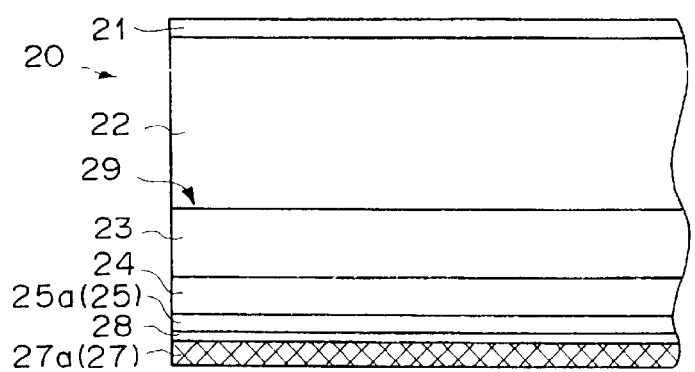
FIG. 1C is an X-Y cross section of a portion shown by an arrow P.

FIGS. 1A through 1C show an outline configuration of an embodiment of an image detector according to the present invention. FIG. 1A is an oblique view of a solid-state radiation detector as the image detector, and FIGS. 1B and 1C are X-Z and X-Y cross sections of portions of the detector shown by arrows Q and P, respectively.

A solid-state radiation detector 20 shown in FIG. 1 comprises a first electrode layer 21 having transparency to recording light L1 such as visible light or X rays representing image information, recording photoconductive layer 22 exhibiting conductivity by being exposed to the recording light L1 having passed through the first electrode layer 21, a charge transport layer 23 acting approximately as an insulator to a latent image charge (negative charge, for example) and acting approximately as a conductor to a transport charge (positive charge in the above example) having the reverse polarity of the latent image charge, a reading photoconductive layer 24 exhibiting conductivity be being exposed to reading light L2 (an electromagnetic wave for reading), a second electrode layer 25 exhibiting transparency to the reading light L2, an insulator layer 28, and a sub-electrode 27 (a charge output electrode), with these layers being disposed in this order. A capacitor 29 for storing an electric charge having the latent image polarity generated within the recording photoconductive layer 22 is formed at an interface between the recording photoconductive layer 22 and the charge transport layer 23.

Upon manufacturing the solid-state radiation detector 20, the sub-electrode 27 is formed (disposed) on a base material such as glass or an organic polymer material having transparency to the reading light L2 and not shown in FIG. 1. Thereafter, in the reverse order of the above description, the insulator layer 28, the second electrode layer 25, the reading photoconductive layer 24, the charge transport layer 23, the recording photoconductive layer 22, and the first photoconductive layer 21 are formed (disposed).

As a material for the recording photoconductive layer 22, a photoconductive material comprising at least one of a-Se (amorphous selenium), leadoxide (II) or lead iodide (II) such as PbO and $PbI_2$, $Bi_{12}(Ge,Si)O_{20}$, and $Bi_2I_3$/organic polymer nanocomposite can be used.

As a material for the charge transport layer 23, a material causing a difference in mobility between the negative charge in the first electrode layer 21 and the positive charge which has the reverse polarity to become larger (such as $10^2$ or more, preferably $10^3$ or more) is desirable. For example, a semiconductive material such as an organic compound like poly-N-vinylcarbazole (PVK), N,N'-diphenyl-N,N'-bis(3-methylphenyl)-[1,1'-biphenyl]-4,4'-diamin (TPD), and a discotic liquid crystal, or TPD dispersed with a polymer material (polycarbonate, polystyrene, PUK), or a-Se doped with 10–200-ppm Cl is preferable. Especially, an organic compound (such as PVK, TPD, or a discotic liquid crystal) is desirable because of its insensitivity to light. Furthermore, an organic compound generally has a small dielectric constant, leading to a smaller capacitance of the charge transport layer 23 and the reading photoconductive layer 24. Therefore, signal output efficiency upon reading can be improved. The "insensitivity to light" refers to approximately zero conductivity upon exposure to the recording light L1 or the reading light L2.

As a material for the reading photoconductive layer 24, a photoconductive material comprising at least one of a-Se, Se—Te, Se—As—Te, non-metal phtalocyanine, metal phtalocyanine, MgPc (Magnesium phtalocyanine), VoPc (Phase II of Vanadyl phtalocyanine), and CuPc (Copper phtalocyanine) is preferable.

In order to sufficiently absorb the recording light L1, thickness of the recording photoconductive layer 22 is preferably between 50 and 1000 $\mu$m. In this embodiment, the thickness is approximately 500 $\mu$m. The sum of thickness of the charge transport layer 23 and the reading photoconductive layer 24 is preferably ½ or less of the thickness of the recording photoconductive layer 22. Since response upon reading improves if the sum is smaller, it is preferable for the sum to be equal to or less than ⅒ or even equal to or less than 1/20 of the thickness of the recording photoconductive layer 22.

As the first electrode layer 21, a transparent conductive layer such as ITO (Indium Tin Oxide) layer is adequate for the case of the recording light being visible light, and a metal layer such as gold or aluminum layer is also adequate for the case of the recording light being radiation such as X rays.

The electrode for light irradiation is formed in the second electrode layer 25, as a stripe electrode 26 having a plurality of elements 26a (linear electrodes) laid out in a stripe-like shape. As a material forming the elements 26a of the stripe electrode 26, 100 nm-thick ITO, 100 nm-thick IDIXO (Idemitsu Indium X-metal Oxide; Idemitsu Kosan Co., Ltd.), 10 nm-thick aluminum, or 10 nm-thick molybdenum can be used, for example. By using these materials, a transmissivity $P_b$ to the reading light L2 can be set to 50% or more. Gaps 25a between the elements 26a may be filled with a nonconductive high-polymer material such as polyethylene including a small amount of pigment like carbon black being dispersed so that the gaps do not have transparency to the reading light L2.

The sub-electrode 27 as a conductive material for outputting an electric signal in accordance with the amount of the latent image charge stored in the capacitor 29 formed at the interface between the recording photoconductive layer 22 and the charge transport layer 23 is located outside the insulator layer 28. The sub-electrode 27 has a plurality of elements (linear sub-electrodes) 27a laid out in a stripe-like shape. The elements 27a are aligned alternately with the elements 26a of the stripe electrode 26. As a material for the elements 27a of the sub-electrode 27, 100 nm-thick aluminum, 100 nm-thick molybdenum, or 100 nm-thick chromium can be used, for example. By using these materials, transmissivity $P_c$ to the reading light L2 becomes 10% or less. Therefore, charged couples for outputting an electric signal are not generated within the reading photoconductive layer 24 corresponding to the elements 27a.

Each of the elements 26a is electrically isolated from each of the elements 27a, due to the insulator layer 28 therebetween.

Figure 2A:
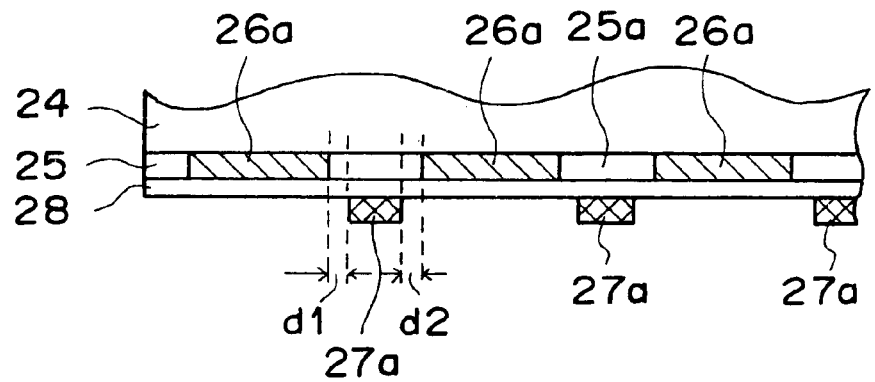
FIGS. 2A and 2B are diagrams showing how elements are laid out.
Figure 2B:
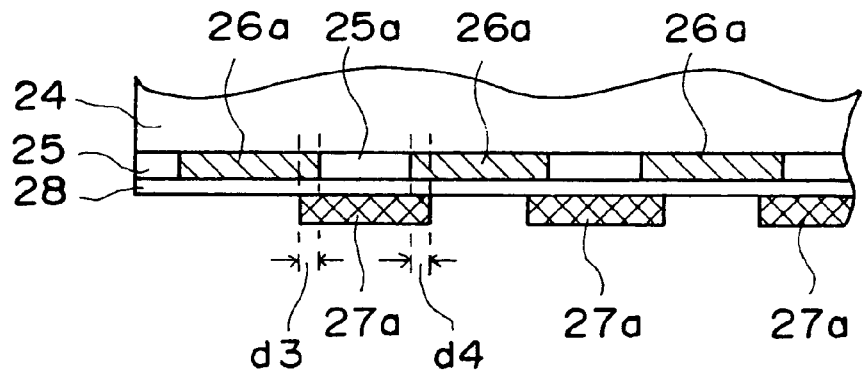

FIGS. 2A and 2B are diagrams showing how the elements 26a and 27a are laid out. Upon alternately aligning the elements 26a and 27a, spaces d1 and d2 are set between each of the elements 26a and each of the elements 27a in a direction of the element alignment, as shown in FIG. 2A. In this manner, the elements 26a and the elements 27a do not overlap in a direction of disposition. Furthermore, as shown in FIG. 2B, portions of the elements 26a and the elements 27a may overlap by widths d3 and d4 in the direction of disposition.

A material having transparency to the reading light L2 is used for the insulator layer 28. For example, $Sio_2$, SiC, or SiN can be used. Alternatively, a resin such as PET (polyethylene terephthalate) or polycarbonate can be used.

It is sufficient for only portions of the insulator layer corresponding to positions of the elements 26a of the stripe electrode 26 to have transparency to the reading light L2. Therefore, transparent portions and nontransparent portions may be formed alternately. It is preferable for the thickness of the insulator layer 28 to be as thin as possible, as long as the elements 26a and the elements 27 are not short-circuited.

In this detector 20, a width $W_c$ of the elements 27a is wider than a width $W_b$ of the elements 26a, and the transmissivity $P_b$ of the element 26a and the transmissivity $P_c$ of the element 27a to the reading light L2 are set to satisfy a condition $(W_b \times P_b)/(W_c \times P_c) \geq 1$ (hereinafter, this condition is called the condition (1)).

The condition (1) above means that the amount of the reading light L2 entering the reading photoconductive layer 24 via the elements 26a for light irradiation (the amount of transmissive light) is always larger than the amount of the reading light L2 entering the reading photoconductive layer 24 via the elements 27a for charge output (the amount of transmissive light), regardless of the widths or the transmissivity of the elements 26a and 27a and regardless of the total amount of the reading light L2.

Since reading efficiency is improved in proportion to a ratio $(W_b \times P_b)/(W_c \times P_c)$, the right-hand side of the condition (1) is set to 5 or more, such as 8, or preferably to 12, for example.

When the detector 20 is used, the stripe electrode 26 is connected to the sub-electrode 27 upon recording an electrostatic latent image so that the sub-electrode 27 contributes to distribution of an electric field in accordance to the fact that the width $W_c$ of the elements 27a is wider than the width $W_b$ of the elements 26a.

By connecting the stripe electrode 26 and the sub-electrode 27 in the above manner upon recording, the latent image charge is stored in positions corresponding to not only the elements 26a but also the elements 27a. Therefore, when the reading light L2 is irradiated on the reading photoconductive layer 24 via the elements 26a, the latent image charge corresponding to a portion above two of the elements 27a adjacent to any one of the elements 26a is sequentially read via the two elements 27a. In this case, a position corresponding to the element 26a becomes the center of a pixel and each half of the two elements 27a adjacent to the element 26a becomes a portion of the pixel in the direction of alignment of the elements 26a and 27a.

A capacitor $C_{*a}$ is formed between the first electrode layer 21 and the capacitor 29 via the recording photoconductive layer 22, and a capacitor $C_{*b}$ is formed between the capacitor 29 and the stripe electrode 26 (elements 26a) via the charge transport layer 23 and the reading photoconductive layer 24. A capacitor $C_{*c}$ is also formed between the capacitor 29 and the sub-electrode 27 (elements 27a) via the reading photoconductive layer 24 and the charge transport layer 23. Upon redistribution of the electric charge in reading, amounts $Q_{+a}$, $Q_{+b}$, $Q_{+c}$ of positive charges distributed to the capacitors $C_{*a}$, $C_{*b}$, and $C_{*c}$ care proportional to capacitance $C_a$, $C_b$, and $C_c$ of the respective capacitors, with a total amount $Q_+$ of the positive charges being equal to a negative charge amount $Q_-$ of the latent image charge. This relationship can be expressed as follows:

$$Q_- = Q_+ = Q_{+a} + Q_{+b} + Q_{+c}$$

$$Q_{+a} = Q_+ \times C_a/(C_a + C_b + C_c)$$

$$Q_{+b} = Q_+ \times C_b/(C_a + C_b + C_c)$$

$$Q_{+c} = Q_+ \times C_c/(C_a + C_b + C_c)$$

The amount of the signal electric charge output from the detector 20 is the same as the sum $(Q_{+a} + Q_{+c})$ of the positive charges distributed to the capacitors $C_{*a}$ and $C_{*c}$, and the positive charge distributed to the capacitor $C_{*b}$ cannot be output as the signal electric charge (see Japanese Patent Application No. 11 (1999)-87922 for detail). In particular, since the electrode for signal draw is not directly prepared in the accumulation-of-electricity section, current Ib which flows out of capacitor $C_{*b}$ becomes internal current which flows within a detector 20 through resistance R*b produced when an optical-switch turns on at the time of reading. Current Ib is not detected between the accumulation-of-electricity section and the stripe electrode, and the positive charge distributed to capacitor $C_{*b}$ in the transparency section cannot be taken out from a detector 20 as a signal charge. That is, the amount $Q_+$ of the positive charge by which charge rearrangement was carried out corresponding to the latent-image charge (negative charge) accumulated at the accumulation-of-electricity section in a detector 20 for the current I becomes the same with amount $Q_{+a}$ of the positive charge distributed to capacitor $C_{*a}$, and flows out of a detector 10.

Stated differently, the positive charge emitted within the photoconduction layer for reading carries out charge recombination with the latent-image charge of the accumulation-of-electricity section, and disappears by the reading light L2. The part $Q_{+b}$ of the amount of the positive charge by which the rearrangement was carried among the negative charges emitted within the photoconduction layer for reading, on the other hand, will carry out charge recombination. After the charge $Q_{+b}$ disappears due to the application of the reading light L2, the charge $Q_{+a}$ and $Q_{+c}$ are re-distributed or rearranged. The current at this time turns into internal current of a detector 20 chiefly. Induction of the negative charge of the same amount as the remaining $Q_{+a}$ is carried out to a read out element, and the current which flows at the time of the charge recombination between this negative charge and the positive charge of the electrode layer is taken out as current I which flows into the detector 20 shell exterior.

When X-rays are irradiated while a voltage is applied, a latent image charge (negative charge) is accumulated in the charge storing section. By means of charge rearrangement corresponding to the respective capacities of capacitors $C_{*a}$, $C_{*b}$ and $C_{*c}$ due to the short-circuiting of electrodes 21, 26*a* and 27*a*, positive charges are distributed to the electrodes. Photo-charges are generated in a photoconductive layer 24 for reading in contact with the transparent electrodes 26*a* by means of the reading light L2, and the charge $Q_{+b}$ in the electrodes 26*a* disappears by the recombination with the electrons in the charge storing section. The electric current generated at that time does not flow out of device 20, and thus cannot be detected. The disappearance of the charge $Q_{+b}$ by recombination results in a change in the electric field, causing a rearrangement of charges. Consequenttly, the positive charges in the electrode 21, 27*a* are caused to flow into electrode 26*a*, and the electric current is detected.

As for the capacitance of the capacitors $C_{*b}$ and $C_{*c}$ formed due to the stripe electrode 26 and the sub-electrode 27, a capacitance ratio $C_b:C_c$ is equal to a width ratio $W_b:W_c$ of the elements 26*a* and 27*a*. Meanwhile, the capacitance $C_a$ of the capacitor $C_{*a}$ and the capacitance $C_b$ of the capacitor $C_{*b}$ are not substantially affected by the sub-electrode 27.

As a result, upon the redistribution of the electric charge in reading, the amount of $Q_{+B}$ of the positive charge distributed to the capacitor $C_{*b}$ can be made smaller than in the case where the sub-electrode 27 is not used, which leads to an increase in the amount of the signal electric charge output from the detector 20 via the sub-electrode 27 than in the case where the sub-electrode 27 is not used. In this manner, reading efficiency and an S/N ratio of an image can be improved.

Furthermore, since the width $W_b$ and the transmissivity $P_b$ to the reading light L2 of the element 26*a*, and the width $W_c$ and the transmissivity $P_c$ to the reading light L2 of the element 27*a* satisfy the condition (1), the amount of the signal electric charge to be output can be increased with certainty, and the reading efficiency and the S/N ratio can also be improved.

In order to obtain more signal electric charge, it is preferable for the width $W_c$ of the element 27*a* to be larger than the width $W_b$ of the element 26*a* as much as possible, since the capacitance ratio between the capacitors $C_{*b}$ and $C_{*c}$ is determined by the width ratio of the elements 26*a* and 27*a*. The transmissivity $P_b$ and $P_c$ of the elements 26*a* and 27*a* to the reading light L2 is set so as to satisfy the condition (1) above.

In the case where the electric charge remaining in the detector 20 is erased, it is preferable for the sub-electrode 27 to have transparency to the reading light L2. However, even in this case, the residual charge can be erased without degrading the reading efficiency and the S/N ratio of an image, by causing the condition (1) to be satisfied.

Since the insulator layer 28 having adequate thickness is located between the stripe electrode 26 and the sub-electrode 27, short circuits between the elements 26*a* and 27*a* becomes less likely. Therefore, the reading efficiency can be improved over an entire surface of the detector 20, and streaky noise due to the short circuit does not appear in an image.

Furthermore, since the thickness of the insulator layer 28 can be determined adequately so that the elements 26*a* and 27*a* are not short-circuited, a distance between the elements 26*a* and 27*a* can be kept small to some degree. Therefore, a reading efficiency the same as in the case where the elements 26*a* and 27*a* are laid out alternately within the second electrode layer 25 can be maintained.

By using the sub-electrode 27 outside the insulator layer 28, erasing an electrostatic latent image due to an electric charge poured from the sub-electrode 27 can be avoided.

Although the preferable embodiment of the image detector according to the present invention has been explained in the above, the present invention is not limited to the above embodiment and various modifications can be made thereto within the scope of the present invention.

For example, an image detector as a basis to which the present invention is applied is not limited to the solid-state radiation detector as the image detector described above.

Any image detector comprising a first electrode layer having transparency to recording light, a recording photoconductive layer exhibiting conductivity by being exposed to the recording light, a reading photoconductive layer exhibiting conductivity by being exposed to reading light, and a second electrode layer comprising a plurality of linear electrodes having transparency to the reading light laid out in a stripe-like shape, with these layers being disposed in this order, can be used. For example, the present invention can be applied to the image detector (solid-state radiation detector) proposed by the applicant in Japanese Patent Application No. 11(1999)-87922.

In the image detector in the above embodiment, the recording photoconductive layer exhibits conductivity by being exposed to the recording radiation. However, the recording photoconductive layer of the image detector of the present invention is not limited to this recording photoconductive layer, and the recording photoconductive layer may exhibit conductivity upon exposure to light emitted by excitation using recording radiation (see Japanese Patent Application No. 10(1998)-271374). In this case, a wavelength conversion layer such as a so-called X-ray scintillator for carrying out wavelength conversion of the recording radiation into light in another wavelength range such as blue light may be disposed on the first electrode layer. For this wavelength conversion layer, cesium iodide (CsI) is preferably used, for example. The first electrode layer has transparency to the light emitted from the wavelength conversion layer due to excitation using the recording radiation.

Alternatively, without having the wavelength conversion layer, a recording photoconductive layer exhibiting conductivity by irradiation of visible light representing image information may be used.

The image detector 20 in the above embodiment has the charge transport layer between the recording photoconductive layer and the reading photoconductive layer, and the capacitor formed at the interface between the recording photoconductive layer and the charge transport layer. However, the charge transport layer may be replaced with a trap layer. In the case where a trap layer is used, the latent image charge is caught by the trap layer and the latent image charge is stored within the trap layer or at an interface between the trap layer and the recording photoconductive layer. Alternatively, a microplate may be used for each pixel, at the interface between the trap layer and the recording photoconductive layer. Moreover, without using the trap layer or the charge transport layer, a microplate may be used at the interface between the recording photoconductive layer and the reading photoconductive layer.

What is claimed is:

1. An optical-reading type image detector comprising a first electrode layer having transparency to recording light representing image information, a recording photoconductive layer exhibiting conductivity by being exposed to the recording light, a reading photoconductive layer exhibiting conductivity by being exposed to reading light, and a second electrode layer comprising a plurality of linear electrodes having transparency to the reading light and laid out in a stripe-like shape, these layers being disposed in the above order, and a capacitor being formed between the recording photoconductive layer and the reading photoconductive layer, the image detector further comprising;

an insulator layer having transparency to the reading light and disposed outside the second electrode layer; and a plurality of linear sub-electrodes laid out in a stripe-like shape outside the insulator layer and in alternation with the linear electrodes, for outputting an electric signal at a level in accordance with the amount of a latent image charge stored in the capacitor.

2. An image detector as claimed in claim 1, wherein the insulator layer comprises any one of $SiO_2$, SiC, and SiN.

3. An optical-reading type image detector according to claim 1, wherein the plurality of linear sub-electrodes are formed from a material that is optically non-transparent.

4. An optical-reading type image detector according to claim 1, wherein the plurality of linear sub-electrodes runs an entire length of the insulator layer.

5. An optical-reading type image detector according to claim 1, wherein each of the plurality of linear sub-electrodes has a width Wc and each of the plurality of linear electrodes has a width Wb, where Wc>Wb.

6. An optical-reading type image detector according to claim 1, wherein each of the plurality of linear sub-electrodes has a transmissivity Pc and each of the plurality of linear electrodes has a transmissivity Pb, where $(Wb \times Pb)/(Wc \times Pc) \geq 1$.

7. An optical-reading type image detector according to claim 1, wherein the insulator layer comprises one of polyethylene terephthalate and polycarbonate.

8. An optical-reading type image detector according to claim 1, further comprising a charge transport layer disposed adjacent to said reading photoconductive layer, wherein a sum of thickness of said charge transport layer and the reading photoconductive layer is less than half of a thickness of the recording photoconductive layer.

* * * * *